United States Patent [19]

Schimmel et al.

[11] Patent Number: 4,539,192

[45] Date of Patent: Sep. 3, 1985

[54] PROCESS FOR REMOVING FLUORINE AND ORGANIC COMPOUNDS FROM PREPURIFIED WET PROCESSED PHOSPHORIC ACID

[75] Inventors: Günther Schimmel, Erftstadt; Reinhard Gradl, Hürth; Gero Heymer, Erftstadt, all of Fed. Rep. of Germany

[73] Assignee: Hoechst Aktiengesellschaft, Fed. Rep. of Germany

[21] Appl. No.: 625,456

[22] Filed: Jun. 28, 1984

[30] Foreign Application Priority Data

Jul. 12, 1983 [DE] Fed. Rep. of Germany ....... 3325121

[51] Int. Cl.$^3$ .............................................. C01B 25/16
[52] U.S. Cl. .............................. 423/321 R; 423/321 S
[58] Field of Search ................ 423/321 R, 321 S, 316, 423/317

[56] References Cited

U.S. PATENT DOCUMENTS

| | | | |
|---|---|---|---|
| 2,165,100 | 7/1939 | Hettrick | 423/321 R |
| 4,233,278 | 11/1980 | Korchnak | 423/321 R |
| 4,279,878 | 7/1981 | Maurer et al. | 423/321 R |
| 4,457,899 | 7/1984 | Grotyohann et al. | 423/321 R |

FOREIGN PATENT DOCUMENTS

| | | |
|---|---|---|
| 0016996 | 3/1980 | European Pat. Off. . |
| 2822303 | 5/1978 | Fed. Rep. of Germany . |
| 3131847 | 8/1981 | Fed. Rep. of Germany . |

*Primary Examiner*—Gregory A. Heller
*Attorney, Agent, or Firm*—Connolly and Hutz

[57] ABSTRACT

The disclosure provides for phosphoric acid to be freed in a single process stage from fluorine and organic contaminants. To this end, the disclosure provides for the acid to be introduced into the upper portion of a closed structural element, for it to be treated therein at elevated temperature and pressure with steam flowing countercurrently to the acid, and for the acid so treated to be reacted in the lower portion of the structural element with hydrogen peroxide. The disclosure also provides an apparatus for carrying out the process.

3 Claims, 1 Drawing Figure

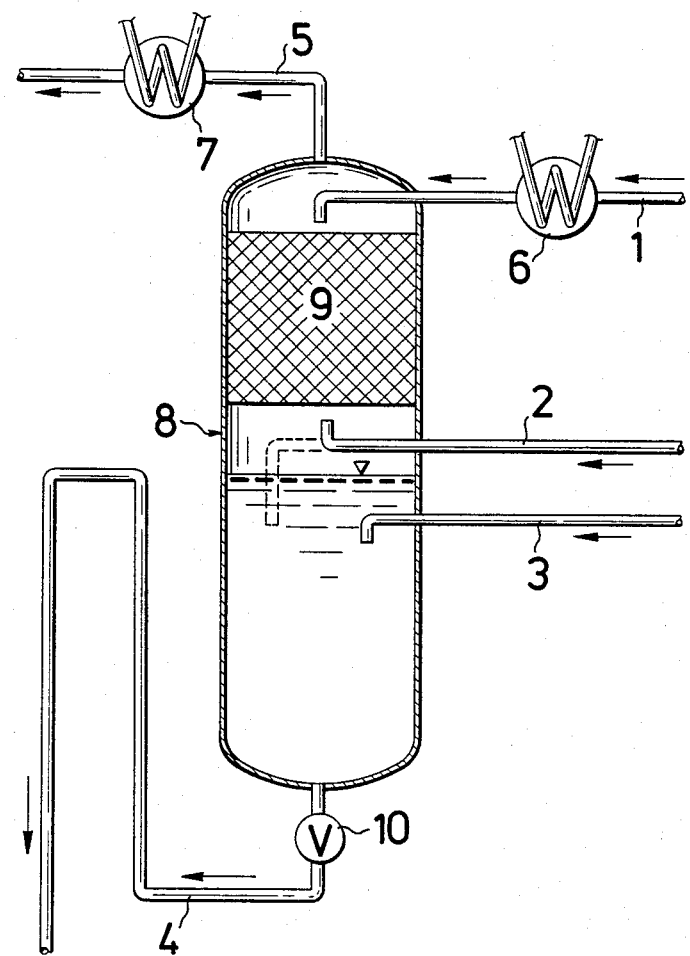

PROCESS FOR REMOVING FLUORINE AND ORGANIC COMPOUNDS FROM PREPURIFIED WET PROCESSED PHOSPHORIC ACID

The present invention relates to a process for removing impurities consisting of fluorine and organic compounds from wet-processed phosphoric acid already prepurified by a conventional extraction method.

It is known that wet-processed phosphoric acid prepurified by a customary extraction method can be treated with steam at elevated temperature and pressure in an evaporator, packed column or tray column so as to give phosphoric acid having food quality as regards its content of fluorine (cf. German Specification DE-AS 28 22 303).

It is also known that wet-processed phosphoric acid, especially phosphoric acid obtained by an extraction method, can be freed from organic contaminants by subjecting the acid to treatment with hydrogen peroxide (cf. European Specification EP-A2 0 016 996, German Specification DE-A1 31 31 847) in the presence or absence of a catalyst at elevated temperature.

The removal of fluorine and organic impurities from phosphoric acid in two separate processing stages is not satisfactory technically and expensive as it is necessary to heat the acid twice, which means high consumption of energy, and to use additional apparatus equipment, namely conveying means, measuring instruments, pressure reservoirs, etc.

In addition to this, only the second of two separate apparatuses can effectively be used for the removal of $C_{org.}$ i.e. the oxygen evolved upon decomposition of $H_2O_2$ is but incompletely utilized.

It is therefore desirable to have a process and apparatus permitting a product having so-called food quality to be easily obtained from phosphoric acid purified by extraction, with minimum expenditure of energy and chemicals.

Phosphoric acid having food quality is a product containing less than 10 ppm F and less than 10 ppm volatile acids, calculated as acetic acid.

The novel process of this invention for removing impurities and organic compounds from wet-processed phosphoric acid prepurified by an extraction method comprises more particularly: removing the said impurities jointly in a single processing stage by introducing the phosphoric acid into the upper portion of a closed structural element, treating it therein with steam flowing countercurrently to the phosphoric acid at a temperature of 120°–180° C. and under a pressure of more than 1 bar; preferably 1.5–2.5 bars; collecting the acid so treated in the lower portion of the said structural element and reacting it with hydrogen peroxide; removing fluorine-containing vaporous matter overhead; and removing purified phosphoric acid from the lower portion of the said structural element.

The process just described has technically and energetically beneficial effects and combines this with the highly advantageous fact that organic constituents of the acid already undergo a multi-stage oxidation in the upper portion of the structural element under the action of oxygen set free during the decomposition of $H_2O_2$ (cf. Examples 1 and 6 hereinafter).

To this end, the present invention preferably provides for the contaminated phosphoric acid to be first preheated and to be introduced then into the structural element; for the hydrogen peroxide to be used as an aqueous solution and for it to be passed through the lower portion of the structural element equidirectionally with the phosphoric acid.

The invention also relates to an apparatus for carrying out the present process, the apparatus being shown diagrammatically in the accompanying drawing and being comprised of a closed structural element 8 terminating upwardly in a vaporous matter outlet 5 and terminating downwardly in a phosphoric acid outlet 4, the said structural element being provided in its upper portion with a feed pipe 1 for supplying contaminated phosphoric acid and, below the said phosphoric acid feed pipe 1, with a steam feed pipe 2 opening into structural element 8 at a level lower or higher than the level of phosphoric acid in structural element 8, and provided in the region of its lower portion with a hydrogen peroxide feed pipe 3.

Preferred features of the apparatus provide:

(a) for a heat exchanger 6 for heating phosphoric acid to be disposed in phosphoric acid feed pipe 1;

(b) for a condenser 7 to be disposed in vaporous matter outlet 5;

(c) for a packing 9 to be disposed in the upper portion of structural element 8;

(d) for the phosphoric acid outlet 4 disposed in the lower portion of structural element 8 to be a siphon permitting the level of phosphoric acid to be regulated;

(e) for a level control device 10 permitting the level of phosphoric acid to be regulated to be disposed in the lower portion of structural element 8;

(f) for the structural element 8 to be a column.

A preferred embodiment of the process of this invention will now be described with reference to the accompanying drawing.

Hot contaminated phosphoric acid is introduced into the head portion of column 8 through line 1 and heat exchanger 6. Disposed in the upper half portion of the column is a layer of packing material, e.g. polytetrafluoroethylene. Steam is introduced under pressure through line 2 opening into the column below the layer of packing material therein, the steam wetting in countercurrent fashion the phosphoric acid dropping down together with the gases set free during $H_2O_2$-decomposition. The lower column portion is free from internals but provided with a level control means (e.g. a siphon or automatically actuated valve) enabling the phosphoric acid level to be maintained approximately at the level of the column's midsection.

Hydrogen peroxide, preferably perhydrol, is pumped into column 8 through line 3 below the surface level of phosphoric acid. Purified phosphoric acid is taken through outlet 4 whilst vaporous matter is removed through condenser 7 and outlet 5.

The entire apparatus is lined with polyvinylidene fluoride or polytetrafluoroethylene, resistant to pressure and provided with a pressure-retaining means. The upper packed portion of the column has a volume of about 3 liters, whilst the lower column portion filled with phosphoric acid has a volume of about 4 liters.

Summarizing, the process and apparatus of this invention offer the following special advantages:

1. The single stage treatment in a closed apparatus prevents the acid from losing heat between the defluorination and oxidation stages.

2. One pressure-retaining system is used for the defluorination at high temperature and decontamination of $C_{org.}$ 3. The high temperature of more than 120° C. avoids the need to use a catalyst for oxidizing the acid; associated therewith are low $H_2O_2$-consumption rates and high space/time-yields.

4. Acid dropping down is pre-oxidized by the oxygen set free during $H_2O_2$-decomposition (cf. Examples 1 and 6).

5. Apparatus is free from mechanically actuated attachments; difficulties during operation as formerly encountered e.g. with shaft packings, are therefore not liable to occur.

6. Stripping treatment with steam alone would reduce the F-value but at the same time intensify the coloration of the acid.

7. Preparation of high-grade phosphoric acid with food quality in a single apparatus, the acid containing less than 10 ppm F and less than 10 ppm $C_{org}$.

The following Examples illustrate the invention and its beneficial effects.

4 l/h phosphoric acid with the following analytical data was introduced into the apparatus:

| $P_2O_5$ | 61.5% | $SO_4$ | 0.02% |
|---|---|---|---|
| Heavy metals | <1 ppm | F | 125 ppm |
| Fe | 2 ppm | $C_{org.}$ | 88 ppm |
| Ca | <5 ppm | opt. transparency (1 cm bulb; 365 mm; to $H_2O$): 68.9% | |

EXAMPLE 1

The acid was heated to 150° C. in heat exchanger 6. 4 kg/h steam flowing countercurrently to the acid was introduced through line 2 under a pressure of 6 bars. 30 ml/h perhydrol (30% $H_2O_2$) was admitted through line 3.

An acid containing 61.3% $P_2O_5$, 7 ppm F and 9 ppm $C_{org.}$ was removed at 4. It had an optional transparency of 98.7%; after having been allowed to stand over 4 weeks under daylight conditions, the transparency was 98.2%.

EXAMPLE 2

The procedure was as in Example 1 but 6 kg/h steam and 60 ml/h perhydrol was used. The purified acid had the following analytical data.

$P_2O_5$: 61.2% F: 4 ppm $C_{org.}$: 5 ppm optical transparency: 99.5% (99.2% after 4 weeks)

EXAMPLE 3

(Comparative Example; DE-A1 31 31 847)

The same phosphoric acid as in Examples 1 and 2 was treated at 80° C. with $H_2O_2$ in 4 glass reactors in cascade arrangement, of which each had a volume of 4 liters. 4 l/h acid was introduced into the first reactor and 25 ml/l $H_2O_2$ (30% strength) was introduced into each reactor, in crossing streams. 1 ppm V (namely $V_2O_5$) was previously added to the phosphoric acid. The total sojourn time in the cascade was 4 h and $H_2O_2$ was used in a total quantity of 100 ml/h. The acid running off had the following analytical data:

$P_2O_5$: 61.8%, F: 115 ppm, $C_{org.}$: 18 ppm; optical transparency: 92%.

EXAMPLE 4

(Comparative Example)

The acid was treated as in Example 1 save that it was preheated to 115° C. only. The acid running off had the following analytical data:

$P_2O_5$: 62.3%, F: 28 ppm, $C_{org.}$: 35 ppm; optical transparency: 90.5%.

EXAMPLE 5

(Comparative Example)

The acid was treated as in Example 1 however without addition of $H_2O_2$ The acid running off had the following analytical data:

$P_2O_5$: 61.4%, F: 10 ppm, $C_{org.}$: 75 ppm; optical transparency: 55.6%.

EXAMPLE 6

(Comparative Example)

The acid treated as in Example 5 was introduced into a flow through reactor (volume about 4 liters) provided with a stirrer and treated at 150° C. with 30 ml/h perhydrol. The acid running off had the following analytical data:

$P_2O_5$: 62.8%, F: 8 ppm, $C_{org.}$: 20 ppm; optical transparency: 93.5%.

We claim:

1. A process for removing impurities consisting of fluorine and organic compounds from wet-processed phosphoric acid prepurified by an extraction process, the process comprising: removing the impurities jointly in a single processing stage by combining the steps of (a) introducing the phosphoric acid into the upper portion of a closed structural element, treating it therein with steam flowing countercurrently to the phosphoric acid, at a temperature of 120°-180° C. and under a pressure of more than 1 bar; and (b) collecting the acid so treated in the lower portion of the structural element and reacting it with hydrogen peroxide; removing fluorine-containing vaporous matter overhead; and removing purified phosphoric acid from the lower portion of the structural element.

2. Process as claimed in claim 1, wherein the prepurified phosphoric acid is first preheated and then introduced into the structural element.

3. Process as claimed in claim 1, wherein the hydrogen peroxide is used as an aqueous solution and passed through the lower portion of the structural element, equidirectionally with respect to phosphoric acid.

* * * * *